(12) United States Patent
Compoint et al.

(10) Patent No.: US 11,370,199 B2
(45) Date of Patent: Jun. 28, 2022

(54) COLOURED LAMINATED GLAZING

(71) Applicant: SAINT-GOBAIN GLASS FRANCE, Courbevoie (FR)

(72) Inventors: François Compoint, Tours (FR); Louis Garnier, Paris (FR); Vincent Rachet, Saint-Cyr en Val (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 201 days.

(21) Appl. No.: 16/472,497

(22) PCT Filed: Dec. 21, 2017

(86) PCT No.: PCT/FR2017/053779
§ 371 (c)(1),
(2) Date: Jun. 21, 2019

(87) PCT Pub. No.: WO2018/115768
PCT Pub. Date: Jun. 28, 2018

(65) Prior Publication Data
US 2020/0189238 A1      Jun. 18, 2020

(30) Foreign Application Priority Data
Dec. 23, 2016   (FR) ...................................... 1663283

(51) Int. Cl.
*B32B 17/10*     (2006.01)
*B32B 37/12*     (2006.01)
(Continued)

(52) U.S. Cl.
CPC .. *B32B 17/10036* (2013.01); *B32B 17/10651* (2013.01); *B32B 17/10706* (2013.01);
(Continued)

(58) Field of Classification Search
CPC ........ B32B 17/10706; B32B 17/10651; B32B 37/10; B32B 37/182; B32B 17/10036;
(Continued)

(56) References Cited

U.S. PATENT DOCUMENTS 2,739,080 A      3/1956  Woodworth
4,302,263 A *   11/1981  Postupack ......... B32B 17/10036
                                                              156/100
(Continued)

FOREIGN PATENT DOCUMENTS

EP     1 483 319 A2   12/2004
FR     2 401 881 A1    3/1979
(Continued)

OTHER PUBLICATIONS

International Search Report is issued in International Application No. PCT/FR2017/053779, dated Apr. 5, 2018.

*Primary Examiner* — Vishal I Patel
(74) *Attorney, Agent, or Firm* — Pillsbury Winthrop Shaw Pittman LLP

(57) ABSTRACT

A process for the manufacture of a colored laminated glazing including at least two glass sheets connected together by a thermoplastic interlayer, includes deposition, by the liquid route, on a first glass sheet, of a polymeric layer including a coloring agent and polymeric compounds, drying and optionally curing of the polymeric layer, assembling of the glass sheet, coated with the colored polymeric layer, with a colorless transparent thermoplastic interlayer and with the second glass sheet, so that the colored polymeric layer is in direct contact with the interlayer, degassing, during which the air trapped between the glass sheets and the thermoplastic interlayer is removed, and heat treatment under pressure and/or under vacuum of the laminated glass at a temperature of between 60 and 200° C., during which the coloring agent present in the polymeric layer migrates (Continued)

toward the thermoplastic interlayer and during which the laminated glazing is assembled.

10 Claims, 1 Drawing Sheet

(51) Int. Cl.
| | | |
|---|---|---|
| C03C 17/28 | (2006.01) | |
| B32B 37/06 | (2006.01) | |
| B32B 37/10 | (2006.01) | |
| B32B 37/24 | (2006.01) | |
| B32B 37/18 | (2006.01) | |

(52) U.S. Cl.
CPC .. *B32B 17/10743* (2013.01); *B32B 17/10761* (2013.01); *B32B 17/10908* (2013.01); *B32B 17/10972* (2013.01); *B32B 37/12* (2013.01); *B32B 17/10174* (2013.01); *B32B 17/10788* (2013.01); *B32B 17/10871* (2013.01); *B32B 37/06* (2013.01); *B32B 37/10* (2013.01); *B32B 37/182* (2013.01); *B32B 37/24* (2013.01); *B32B 2037/1253* (2013.01); *B32B 2309/02* (2013.01); *B32B 2310/0806* (2013.01); *B32B 2315/08* (2013.01); *B32B 2605/006* (2013.01); *B32B 2605/08* (2013.01); *C03C 17/28* (2013.01); *C03C 2218/118* (2013.01)

(58) Field of Classification Search
CPC ..... B32B 37/12; B32B 37/24; B32B 2605/08; B32B 17/10174; B32B 17/10908; B32B 2310/0806; B32B 17/10871; B32B 37/06; B32B 17/10761; B32B 2037/1253; B32B 17/10743; B32B 2309/02; B32B 2315/08; B32B 17/10788; B32B 2605/006; B32B 17/10972; C03C 2218/118; C03C 17/28
See application file for complete search history.

(56) References Cited

U.S. PATENT DOCUMENTS

| | | | |
|---|---|---|---|
| 5,059,254 A | 10/1991 | Yaba et al. | |
| 2004/0028953 A1 | 2/2004 | Kraemling | |
| 2006/0191625 A1* | 8/2006 | Kapp | B32B 17/10247 156/99 |
| 2011/0096555 A1* | 4/2011 | Pires | B32B 17/10761 362/363 |
| 2014/0356591 A1* | 12/2014 | Motohashi | B32B 37/12 428/200 |
| 2015/0192707 A1* | 7/2015 | Ehrensperger | G02B 5/0257 359/599 |

FOREIGN PATENT DOCUMENTS

| | | |
|---|---|---|
| FR | 2 925 483 A1 | 6/2009 |
| KR | 10-1671192 B1 | 11/2016 |
| WO | WO 01/00404 A1 | 1/2001 |
| WO | WO 2004/018378 A2 | 3/2004 |

\* cited by examiner

COLOURED LAMINATED GLAZING

CROSS-REFERENCE TO RELATED APPLICATIONS

This application is the U.S. National Stage of PCT/FR2017/053779, filed Dec. 21, 2017, which in turn claims priority to French patent application number 1663283 filed Dec. 23, 2016. The content of these applications are incorporated herein by reference in their entireties.

The present invention relates to its process for the manufacture of a colored laminated glazing, and also to the glazing capable of being obtained by this process.

Laminated glazings are commonly used in the motor vehicle, aeronautical or construction fields, since they exhibit the advantage of being "safety" glazings. They consist of two glass sheets connected together by an a thermoplastic interlayer layer. When it is desired to obtain colored laminated glasses, one of the possibilities consists in using an interlayer layer which is itself colored. The coloration is thus introduced during the process for the manufacture of the interlayer, as is, for example, described in the application EP 1 483 319. This solution remains expensive and not very flexible for the final user. This is because the coloration (tint level and choice of the color) is set by the manufacturer of the interlayer layer. Another known solution for manufacturing colored laminated glazings consists in inserting, between one of the glass sheets and the thermoplastic interlayer layer, a colored layer based on matrix which can be organic or mixed organic/organic and which comprise dyes or pigments. The application FR 2 925 483 describes, for example, the possibility of applying a layer of lacquer comprising pigments or dyes to one of the glass sheets. When the color is contributed by the addition of a colored layer between the thermoplastic interlayer and the glass sheets, it is more difficult to obtain a homogeneous coloring on large-sized substrates by deposition processes carried out by the liquid route. The colored layers are furthermore of relatively low thickness. The patent application FR 2 401 881 describes a process which makes it possible to color the thermoplastic interlayer by a thermoprinting process by applying a temporary cellulose support comprising the coloring or the pattern to be transferred onto the thermoplastic interlayer. The dyes present on the support are transferred by sublimation toward the thermoplastic interlayer and then the support is subsequently withdrawn before the laminated glazing is assembled. This type of process is unwieldy to carry out as it adds additional manufacturing stages for the transfer. Moreover, the printings or transfers carried out by sublimation do not make it possible to guarantee that the thermoplastic interlayer is colored over the whole of its thickness. This is because the dye has a tendency to remain at the surface since it cools and solidifies as soon as it reaches the surface to be printed.

The aim is to develop a process for the manufacture of colored laminated glazings which is simple, which can be carried out on existing lines for the manufacture of laminated glazings and which makes it possible to reduce the manufacturing costs while using colorless transparent thermoplastic interlayer layers. The present invention sits within this context, which invention provides a manufacturing process which makes it possible to guarantee low manufacturing costs but also a very good homogeneity of the coloring over the whole of the surface area of the glazing, even when the latter is large in size.

The process according to the present invention is a process for the manufacture of a colored laminated glazing comprising at least two glass sheets connected together by a transparent thermoplastic interlayer which is colorless before the stage of final assembling of the glazing and which colors during the manufacture of the glazing.

Said process for the manufacture of the colored laminated glazing comprises the following stages:
 deposition, by the liquid route, on a first glass sheet, of a polymeric layer comprising a coloring agent and polymeric compounds,
 drying and optionally curing of the polymeric layer,
 assembling of the glass sheet, coated with the colored polymeric layer, with a colorless transparent thermoplastic interlayer and with the second glass sheet, so that the colored polymeric layer is in direct contact with said interlayer,
 degassing, during which the air trapped between the glass sheets and the thermoplastic interlayer is removed, and
 heat treatment under pressure and/or under vacuum of the laminated glass at a temperature of between 60 and 200° C., during which the coloring agent present in the polymeric layer migrates toward the thermoplastic interlayer and during which the laminated glazing is assembled.

Advantageously, the process according to the present invention makes it possible to use an initially colorless thermoplastic interlayer, and thus less expensive than the solutions employing the use of a precolored thermoplastic interlayer. The coloring is contributed by the presence of a polymeric layer, easy to apply by the liquid route and relative inexpensive, on at least one of the internal faces of one of the constituent glass sheets of the laminated glazing. During the process for the manufacture of the glazing and in particular during the assembling of the different constituent parts of the glazing, a phenomenon of migration of the coloring agent takes place uniformly over the whole of the thickness of the polymeric interlayer. The homogeneity of the coloring is thus guaranteed, even on large-sized substrates, using a process which is simple to carry out and which does not require modifying the conventional stages of the processes for the manufacture of a laminated glazing (assembling of the different parts, degassing and heat treatment for the purpose of the final adhesive bonding). Surprisingly, this process makes it possible to obtain laminated glazings having a homogeneous coloring, without requiring an "optical" grade of the tinted polymeric layer. The assembling and heat treatment phase corrects the coloring imperfections which may possibly exist in the colored polymeric layer.

Figure 1:
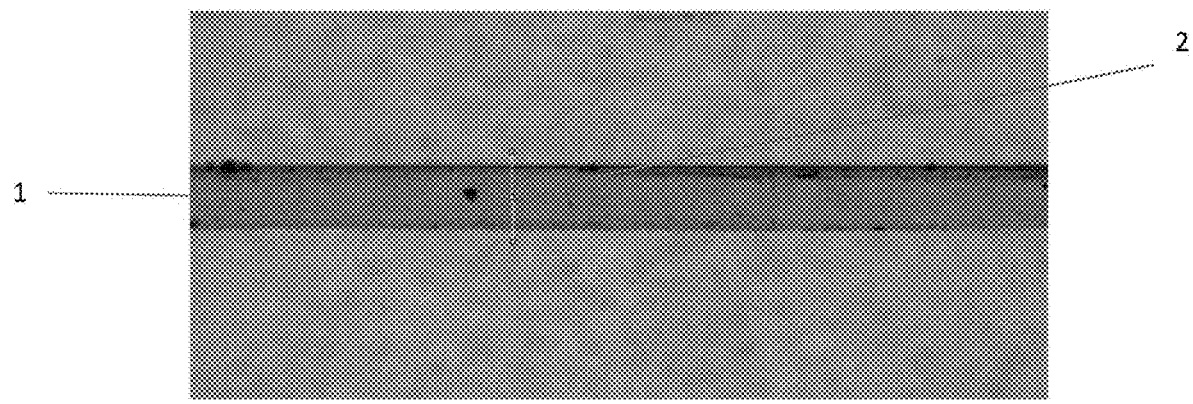
FIG. 1 shows the edge face of a laminated glazing according to an embodiment of the invention.

Within the meaning of the present invention, "internal face" of a glass sheet is understood to mean the face of the sheet which is found, after assembling, in contact with the thermoplastic interlayer. The internal faces in a laminated glazing comprising two glass sheets are often known as face 2 and face 3, the face 2 belonging to the first sheet and the face 3 to the second glass sheet. In the process according to the present invention, the internal faces (or also face 2 or 3) are those on which the polymeric layer is deposited. This layer can be deposited on a face of one of the two glass sheets constituting the laminated glazing or on a face of each of the glass sheets constituting the laminated glazing.

The polymeric layer is a layer which can be applied by the liquid route. The polymer can be dissolved in a solvent in order to make possible the deposition by the liquid route. Mention may be made, for example, of a polymeric layer based on polyvinyl butyral, on polyethylene or on ethylene/vinyl acetate dissolved in a solvent. Any other polymeric material chemically compatible with the thermoplastic interlayer placed between the two glass sheets can be used. Preferably, with the objective of using polymer formulations with as little solvent as possible for EHS aspects, the colored polymeric layer is preferably a layer obtained from a composition comprising epoxide compounds or (meth)acrylate compounds. The polymeric layer is, for example, obtained from a liquid composition comprising (meth)acrylate compounds chosen from monomers, oligomers or polymers comprising at least one methacrylate functional group.

(Meth)acrylate is understood to mean an acrylate or a methacrylate. "(Meth)acrylate compounds" is understood to mean the esters of acrylic or methacrylic acid comprising at least one acryloyl ($CH_2$=CH—CO—) or methacryloyl ($CH_2$=$CH(CH_3)$—CO—) functional group. These esters can be monomers, oligomers, prepolymers or polymers. These (meth)acrylate compounds, when they are subjected to polymerization conditions, give a polymer network having a solid structure.

The liquid composition comprises at least one aliphatic urethane/acrylate oligomer, at least one mono-, bi- or tri-functional (meth)acrylate monomer, at least one polymerization initiator and at least one coloring agent. Preferably, the (meth)acrylate monomer is mono- or bifunctional and it thus comprises at most two reactive sites. The relatively low functionality of the monomers used to polymerize the polymeric layer facilitates the migration of the coloring agent within the layer.

The liquid composition advantageously comprises, as percentage by weight with respect to the total weight of the (meth)acrylate compounds, from 30% to 80% by weight of at least one aliphatic urethane/acrylate oligomer and from 20% to 70% by weight of at least one mono- or bifunctional (meth)acrylate monomer. The coloring agent represents between 0.01% and 10% by weight, with respect to the total weight of the polymeric compounds. The coloring agent is, for example, an organic compound. It is inserted into the polymeric composition in the molecular state, that is to say that it is dissolved in the composition and does not form solid particles. Very advantageously, the dye has acid/base properties which make it possible to increase its affinity with the thermoplastic interlayer. Thus, by way of example, the dye is an organic compound of Lewis acid type and the thermoplastic interlayer is a base, which makes it possible to promote the migration of the dye from the polymeric layer toward the thermoplastic interlayer. Mention may be made, for example, as dye, of derivatives of the family of the anthraquinones (Acid Blue 25, Alizarin, Anthrapurpurin, Carminic acid, 1,4-Diamino-2,3-dihydroanthraquinone, 7,14-Dibenzpyrenequinone, Dibromoanthanthrone, 1,3-Dihydroxyanthraquinone, 1,4-Dihydroxyanthraquinone, Disperse Red 9, Disperse Red 11, Indanthrone Blue, Morindone, Oil Blue 35, Oil Blue A, Parietin, Quinizarine Green SS, Remazol Brilliant Blue R, Solvent Violet 13, 1,2,4-Trihydroxyanthraquinone, Vat Orange 1, Vat Yellow 1) or products of the Neozapon®, Irgasperse®, Basantol® and Orasol® ranges, sold by BASF.

The polymeric layer can comprise, in its composition, an adhesion-promoting agent, such as, for example, a silane or any other adhesion-promoting compound based on a metal, such as titanium, zirconium, tin or aluminum.

The polymeric layer is deposited, on one face of at least one of the glass sheets, by application, at ambient temperature, of said liquid composition by roll coating, by sprinkling, by dipping, by curtain coating or by spraying. Preferably, the liquid composition is applied by roll coating or by curtain coating.

After having been deposited on one of the faces of at least one glass sheet, the polymeric layer is dried and/or cured at a temperature of less than 200° C. If the polymeric layer deposited contains a solvent, the latter will be evaporated during the drying stage. The polymeric layer can also be cured during this stage, which entails a curing/crosslinking, for example by UV radiation or by an electron beam.

The thickness of the cured polymeric layer is between 1 and 200 µm.

The stage of deposition of the polymeric layer can be carried out directly on the laminated glazing manufacturing line and then constitutes the first stage during the factory manufacture of the laminated glazing. The deposition stage can also be carried out on a manufacturing line other than that of the laminated glazing. In this case, the glass sheet or sheets coated with the polymer layer arrive on the line for the manufacture of the laminated glazings with the polymeric coating dried and/or cured.

The glass sheet, thus coated with the polymeric layer, is subsequently assembled with the thermoplastic interlayer and with a second glass sheet in order to form the laminated glazing. The second glass sheet can also comprise a polymeric layer on its face intended to be the internal face in the laminated glazing. This layer can be identical to that deposited on the first glass sheet.

In order to improve the adhesion between the different elements constituting the laminated glazing, namely between the glass sheets and the thermoplastic interlayer, the process according to the invention can comprise a stage of treatment, by an adhesion-promoting agent, of the surface of the glass sheet on which the colored polymeric layer is deposited and/or of the surface of the face of the thermoplastic interlayer in contact with the polymeric layer.

The thermoplastic interlayer is polyvinyl butyral, polyethylene, ethylene/vinyl acetate or any other thermoplastic material. The interlayer can be composed of several layers combined together, the underlayer in contact with the polymeric layer being an underlayer of organic nature.

The process according to the invention advantageously makes it possible to prepare colored laminated glasses without requiring modification of the phases of assembling of the laminated glazing. From the moment when the constituent glass sheet or sheets of the laminated glazing are coated with the colored polymeric layer, they are assembled with the thermoplastic interlayer in the normal way by a heat treatment at a temperature of between 100° C. and 200° C., under vacuum and/or under pressure. This heat treatment can, for example, be carried out in an autoclave at a temperature of between 135° C. and 145° C., under a pressure of between 5 and 14 bar.

The invention also relates to a laminated glazing capable of being obtained by the process described above. This glazing can be used in the field of the construction industry, having a decorative use in particular, or else as motor vehicle glazing. The laminated glazings obtained have the mechanical strength desired for this type of application and can be regarded as safety glazings.

EXAMPLE 1 ACCORDING TO THE INVENTION

A liquid composition comprising an acrylate oligomer of Sartomer CN9002 (bifunctional aliphatic urethane/acrylate oligomer), CN131B (aromatic monoacrylate monomer) or SR610 (polyethylene glycol acrylate oligomer) type and of SR 410 monomer (monofunctional aromatic acrylic monomer) is prepared with a 50/50 ratio by weight. A dye of anthraquinone type is added to the acrylate formulation in a proportion of 0.5% by weight, with respect to the total of the matrix. An amount of 5% by weight of a photoinitiator of Speedcure 500 type is added to the preceding mixture so as to make possible the initiation of the polymerization. The liquid composition thus obtained is deposited by the liquid route by roll coating on a substrate made of glass. The parameters of the roll are adjusted so as to obtain a wet thickness of 40 µm (speed of the applicator roll of between 15 and 25 m/min). The layer thus obtained is cured by UV irradiation (dose of UV-B of 280 mJ/cm² approximately, rate of forward progression of 16 m/min). The thickness of the dry colored layer is approximately 30 µm. An interlayer made of colorless PVB is positioned on the glass sheet coated with the colored layer and a second glass sheet is positioned on the interlayer, so as to close the laminated glazing. The combination is placed in an autoclave for 30 minutes at 145° C. under a pressure of 10 bar.

On removing from the autoclave, a colored and transparent laminated glass is obtained.

Figure 2:
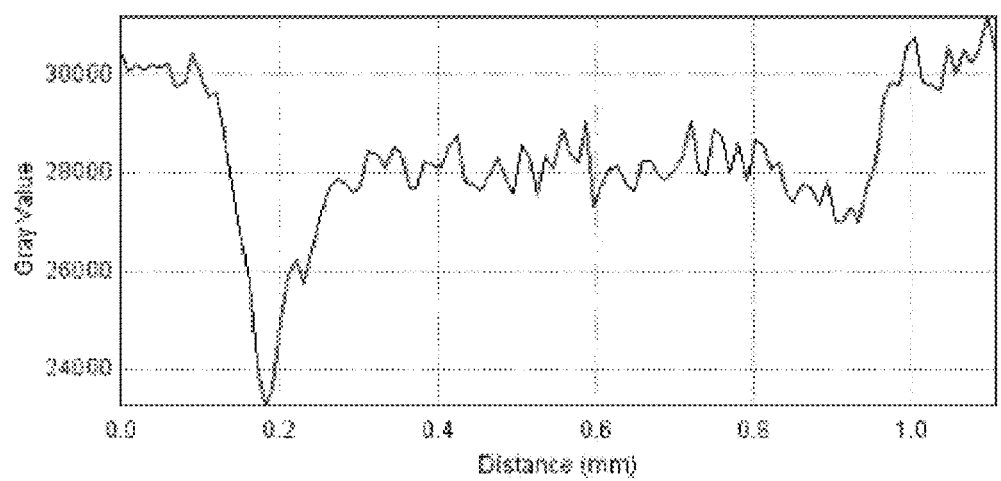
FIG. 2 represents the level of gray value measured over a profile corresponding to the zone represented in FIG. 1.

Observation with a microscope of the edge face of the laminated glazing thus obtained (see FIG. 1, which corresponds to the observation made with a magnification ×10 under monochromatic lighting) shows that the coloring of the interlayer made of PVB (1) is homogeneous. The PVB sheet (1), which is completely tinted red over its entire thickness due to the migration of the dye initially present in the polymeric layer, appears gray with the microscope. The darker bands on the sides of the edge face in the image of FIG. 1 correspond to the shadow generated by the edge of the edge face. The level of gray is measured over a profile corresponding to the zone (2) represented in FIG. 1 with Image J, which gives the gray values as a function of the distance, is constant. This profile, given in FIG. 2, confirms the homogeneity of the coloring.

EXAMPLE 2 ACCORDING TO THE INVENTION

A liquid composition comprising an acrylate oligomer of Sartomer CN9002 (bifunctional aliphatic urethane/acrylate oligomer), CN131B (aromatic monoacrylate monomer) or SR610 (polyethylene glycol acrylate oligomer) type and of SR 410 monomer (monofunctional aromatic acrylic monomer) is prepared with a 50/50 ratio by weight. A dye of anthraquinone type is added to the acrylate formulation in a proportion of 0.5% by weight, with respect to the total of the matrix. An amount of 5% by weight of a photoinitiator of Speedcure 500 type is added to the preceding mixture so as to make possible the initiation of the polymerization. The liquid composition thus obtained is deposited by the liquid route by roll coating on a substrate made of glass. The parameters of the roll are adjusted so as to obtain a wet thickness of 15 µm (speed of the applicator roll of between 15 and 25 m/min). The layer thus obtained is cured by UV irradiation (dose of UV-B of 280 mJ/cm² approximately, rate of forward progression of 16 m/min). The thickness of the dry colored layer is approximately 5 µm. An interlayer made of colorless PVB is positioned on the glass sheet coated with the colored layer and a second glass sheet is positioned on the interlayer, so as to close the laminated glazing. The combination is placed in an autoclave for 30 minutes at 145° C. under a pressure of 10 bar.

On removing from the autoclave, a colored and transparent laminated glass is obtained. The molecular migration of the dye from the colored layer toward the PVB interlayer is homogeneous over the entire edge face of the interlayer made of PVB.

EXAMPLE 3 ACCORDING TO THE INVENTION

A liquid composition comprising an acrylate oligomer of Sartomer CN9002 (bifunctional aliphatic urethane/acrylate oligomer), CN131B (aromatic monoacrylate monomer) or SR610 (polyethylene glycol acrylate oligomer) type and of SR 410 monomer (monofunctional aromatic acrylic monomer) is prepared with a 50/50 ratio by weight. A dye of anthraquinone type is added to the acrylate formulation in an amount of 0.13% by weight. 5% by weight of a photoinitiator of Speedcure 500 type is added to the preceding mixture so as to make possible the initiation of the polymerization. The liquid composition thus obtained is deposited by the liquid route by mechanical coating with a bar coater (tire film) on a substrate made of glass. The parameters are adjusted so as to obtain a wet layer with a thickness of 200 µm. The layer thus obtained is cured by UV irradiation (dose of UV-B of 250 mJ/cm² approximately, rate of forward progression of 10 m/min). The thickness of the dry colored layer is approximately 150 µm. An interlayer made of colorless PVB is positioned on the glass sheet coated with the colored layer and a second glass sheet is positioned on the interlayer, so as to close the laminated glazing. The combination is placed in an autoclave for 45 minutes at 140° C. under a pressure of 10 bar.

On removing from the autoclave, a colored and transparent laminated glass is obtained. The molecular migration of the dye from the colored layer toward the PVB interlayer is homogeneous over the entire edge face of the interlayer made of PVB.

EXAMPLE 4 ACCORDING TO THE INVENTION

A liquid composition comprising an acrylate oligomer of Sartomer CN9002 (bifunctional aliphatic urethane/acrylate oligomer), CN131B (aromatic monoacrylate monomer) or SR610 (polyethylene glycol acrylate oligomer) type and of SR 410 monomer (monofunctional aromatic acrylic monomer) is prepared with a 50/50 ratio by weight. A dye of anthraquinone type is added to the acrylate formulation in an amount of 0.5% by weight. 5% by weight of a photoinitiator of Speedcure 500 type is added to the preceding mixture so as to make possible the initiation of the polymerization. The liquid composition thus obtained is deposited by the liquid route by mechanical coating with a bar coater (tire film) on a substrate made of glass. The parameters are adjusted so as to obtain a wet layer with a thickness of 30 µm. The layer thus obtained is cured by UV irradiation (dose of UV-B of 250 mJ/cm² approximately, rate of forward progression of 10 m/min). The thickness of the dry colored layer is approximately 20 µm. An interlayer made of colorless PVB is positioned on the glass sheet coated with the colored layer and a second glass sheet is positioned on the interlayer, so as to close the laminated glazing. The combination is placed in an autoclave for 45 minutes at 140° C. under a pressure of 10 bar.

On removing from the autoclave, a colored and transparent laminated glass is obtained. The molecular migration of the dye from the colored layer toward the PVB interlayer is homogeneous over the entire edge face of the interlayer made of PVB.

Charpy impact mechanical strength tests were carried out on approximately ten samples obtained according to examples 1 to 4 described above. These impact tests consist in releasing, from a predetermined height, a pendulum equipped with a spherical impactor made of stainless steel, with an energy of 2.3 J, onto laminated glazing samples with a surface area of 49 cm$^2$ consisting, in thickness, of two glass sheets of 2 mm, of the colored layer of a few µm and of the PVB interlayer of 0.8 mm, and in measuring the loss in weight of the glazing after the impact. The majority of the glazings tested showed that the face on which the polymeric layer is deposited is not broken. Moreover, the samples show that the loss in weight is always less than 1%, indeed even very often less than 0.2%, which reflects a very good mechanical strength of the samples tested.

The safety performance qualities of the laminated glazing obtained by the process according to the present invention are thus indeed retained.

The invention claimed is:

1. A process for the manufacture of a colored laminated glazing comprising at least two glass sheets connected together by a thermoplastic interlayer, comprising:
   depositing, by a liquid route, on a first glass sheet, of a polymeric layer comprising a coloring agent and polymeric compounds,
   drying and optionally curing of the polymeric layer,
   assembling of the glass sheet, coated with the colored polymeric layer, with a colorless transparent thermoplastic interlayer and with the second glass sheet, so that the colored polymeric layer is in direct contact with said interlayer,
   degassing, during which air trapped between the glass sheets and the thermoplastic interlayer is removed, and
   heat treatment under pressure and/or under vacuum of the laminated glass at a temperature of between 60 and 200° C., during which the coloring agent present in the polymeric layer migrates toward the thermoplastic interlayer and during which the laminated glazing is assembled,
   wherein the colored polymeric layer is a layer obtained by curing a liquid composition comprising (meth)acrylate compounds, and
   wherein the liquid composition comprises, as percentage by weight with respect to the total weight of the (meth)acrylate compounds, from 30% to 80% by weight of at least one aliphatic urethane/acrylate oligomer and from 20% to 70% by weight of at least one mono-or bifunctional (meth)acrylate monomer.

2. A process for the manufacture of a colored laminated glazing comprising at least two glass sheets connected together by a thermoplastic interlayer, comprising:
   depositing, by a liquid route, on a first glass sheet, of a polymeric layer comprising a coloring agent and polymeric compounds,
   drying and optionally curing of the polymeric layer,
   assembling of the glass sheet, coated with the colored polymeric layer, with a colorless transparent thermoplastic interlayer and with the second glass sheet, so that the colored polymeric layer is in direct contact with said interlayer,
   degassing, during which air trapped between the glass sheets and the thermoplastic interlayer is removed, and
   heat treatment under pressure and/or under vacuum of the laminated glass at a temperature of between 60 and 200° C., during which the coloring agent present in the polymeric layer migrates toward the thermoplastic interlayer and during which the laminated glazing is assembled, wherein the liquid composition comprises at least one aliphatic urethane/acrylate oligomer, at least one mono-, bi- or trifunctional (meth)acrylate monomer, at least one polymerization initiator and at least one coloring agent.

3. The process as claimed in claim 1, wherein the coloring agent represents between 0.01% and 10% by weight, with respect to the total weight of the polymeric compounds.

4. The process as claimed in claim 1, wherein the polymeric layer comprises an adhesion-promoting agent.

5. The process as claimed in claim 1, wherein the polymeric layer is deposited by application, at ambient temperature, of a liquid composition by roll coating, by sprinkling, by dipping, by curtain coating or by spraying.

6. The process as claimed in claim 5, wherein the liquid composition is applied by roll coating or by curtain coating.

7. The process as claimed in claim 1, wherein the polymeric layer is cured by drying at a temperature of less than 200° C., by UV crosslinking or by an electron beam.

8. The process as claimed in claim 1, wherein a thickness of the cured polymeric layer is between 1 and 200 µm.

9. The process as claimed in claim 1, further comprising a stage of treatment, by an adhesion-promoting agent, of the surface of the glass sheet on which the colored polymeric layer is deposited and/or of the surface of the face of the thermoplastic interlayer in contact with the polymeric layer.

10. The process as claimed in claim 1, wherein the thermoplastic interlayer is polyvinyl butyral, polyethylene or ethylene/vinyl acetate.

* * * * *